United States Patent [19]
Sulich et al.

[11] Patent Number: 5,875,412
[45] Date of Patent: Feb. 23, 1999

[54] VEHICLE NAVIGATION AND ROUTE GUIDANCE SYSTEM

[75] Inventors: Janusz S. Sulich, Southfield; Ronald P. Knockeart, Clarkston, both of Mich.

[73] Assignee: Siemens Automotive L.P., Auburn Hills, Mich.

[21] Appl. No.: 872,287

[22] Filed: Jun. 10, 1997

Related U.S. Application Data

[63] Continuation of Ser. No. 605,648, Feb. 22, 1996, abandoned, which is a continuation-in-part of Ser. No. 285,241, Aug. 3, 1994, abandoned.

[51] Int. Cl.[6] ................................................. G06F 165/00
[52] U.S. Cl. ..................... 701/207; 701/210; 701/211; 340/988
[58] Field of Search .................................. 701/200, 202, 701/207, 209, 210, 211, 213, 117; 73/178 R; 340/990, 988, 995

[56] References Cited

U.S. PATENT DOCUMENTS

| | | | |
|---|---|---|---|
| 4,350,970 | 9/1982 | Von Tomkewitsch | 364/436 |
| 4,954,958 | 9/1990 | Savage et al. | 364/444 |
| 5,303,163 | 4/1994 | Ebaugh et al. | 364/424.04 |
| 5,365,449 | 11/1994 | Kashiwazaki | 364/444 |
| 5,537,324 | 7/1996 | Nimur et al. | 364/443 |

FOREIGN PATENT DOCUMENTS

| | | |
|---|---|---|
| 2-187898 | 7/1990 | Japan . |
| 6-208698 | 7/1994 | Japan . |

*Primary Examiner*—Gary Chin
*Attorney, Agent, or Firm*—Russel C. Wells

[57] ABSTRACT

A vehicle navigation system 10 utilizing a wireless communications medium 74 for transmitting present position 77 and destination position 75 data to a central processing means 14 for generating a route. The central processing means generates a series of turn-by-turn routing vectors 82–87 comprising the route. The wireless communications medium transmits the turn-by-turn routing vectors to the vehicle for display either audibly or visually or both to the vehicle operator 34. A vehicle identification means can be used for updating the routing vectors upon subsequent transmissions.

3 Claims, 3 Drawing Sheets

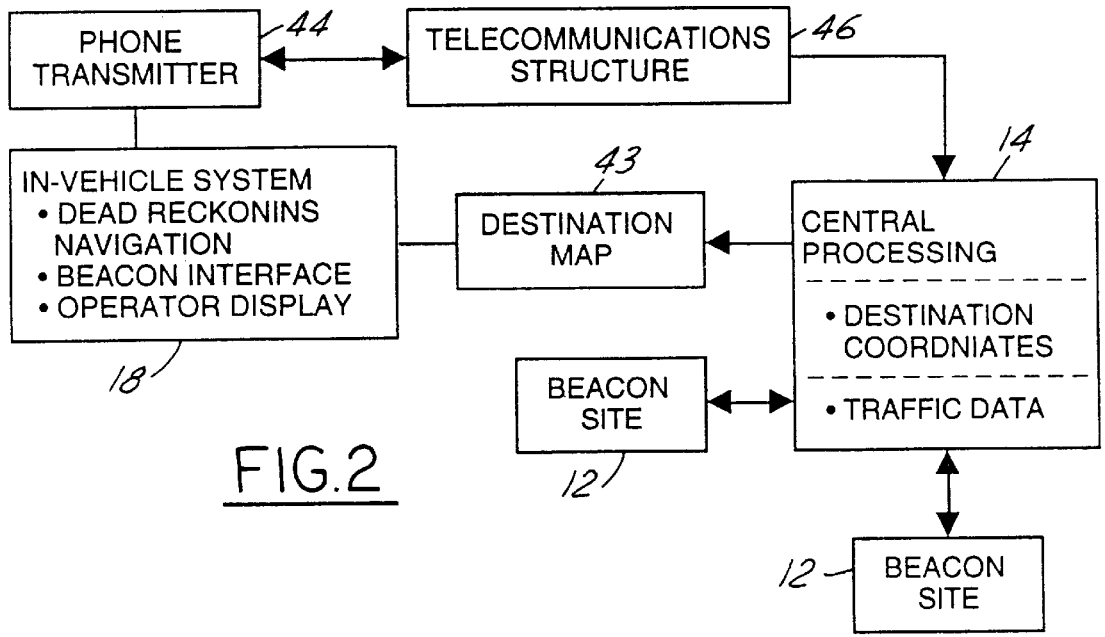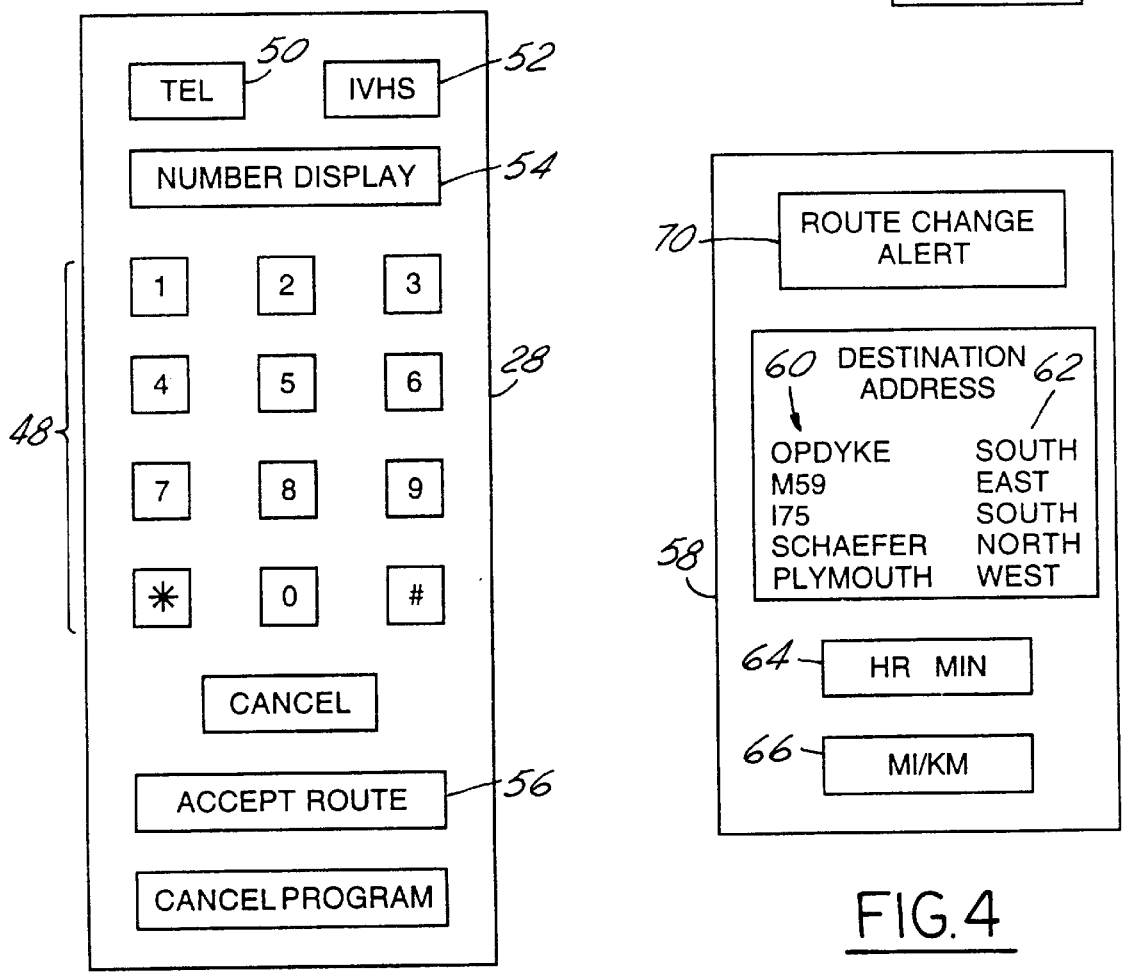

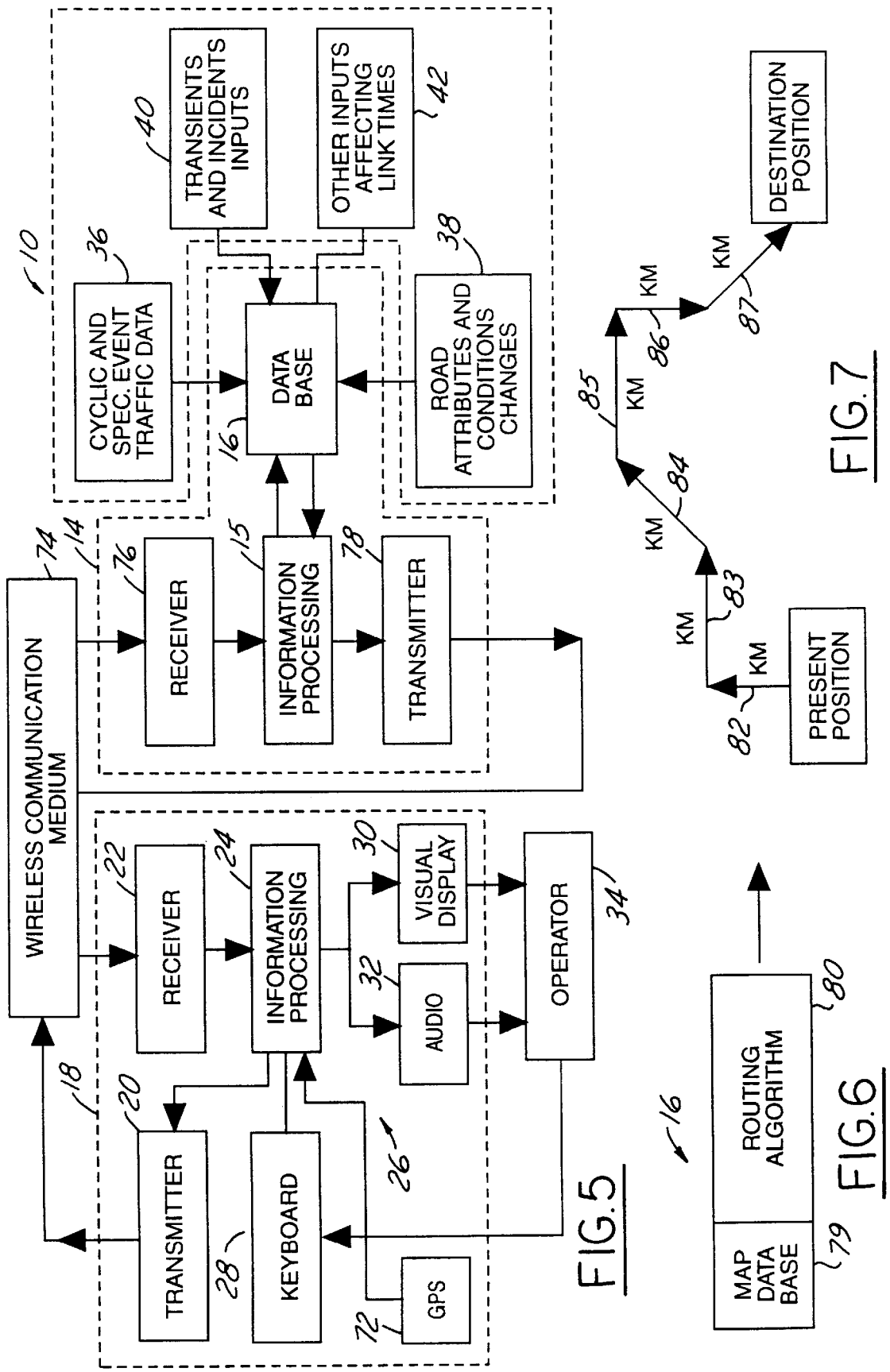

VEHICLE NAVIGATION AND ROUTE GUIDANCE SYSTEM

This is a continuation of application Ser. No. 08/605,648 filed on Feb. 22, 1996, now abandoned, which is a CIP of application Ser. No. 08/285,241 filed on Aug. 3, 1994, now abandoned.

This invention relates to data processing control systems in general and more particularly to motor vehicle navigation and route guidance systems determining the destination address from a telephone number. US class 364/444 or Int. class G06F 15/50.

BRIEF SUMMARY OF THE INVENTION

BACKGROUND OF THE INVENTION

There are fundamentally two different types of vehicle navigational systems. The first system makes use of stored map displays wherein the maps of a predetermined area are stored in the invehicle computer and displayed to the vehicle operator or driver. The maps, knowing the location where the vehicle started and where it is to go, will highlight the direction and the driver will have to read the display and follow the route. One such stored map display system offered by General Motors on their 1994 Oldsmobile, uses Global Positioning System (GPS) satellites and advanced dead reckoning techniques to determine a precise location. The driver enters details of the desired destination into an on-board or invehicle, computer, in the form of specific address, a road intersection, etc. The stored map is displayed and the operator then pinpoints the desired destination. The on-board computer then calculates the most efficient route. The on-board computer then displays on a display unit, the distance to and the direction of each turning maneuver in easy-to-read graphics and also includes a voice prompt.

The second system, such as the Siemens Ali-Scout™ system, requires that the driver key-in the destination address, in geodetic coordinates, into the invehicle computer. A compass means located in the vehicle then gives a "compass" direction to the destination address. Such a "compass" direction is shown in easy-to-read graphics as an arrow on a display unit indicating the direction the driver should go. Along the side of the road are several infrared beacon sites which transmit data information to the properly equipped vehicle relative to the preferred routing to the next adjacent beacon sites. From all of the data the invehicle computer receives, the invehicle computer selects the desired beacon data information to the next beacon along the route direction to the final destination and displays a graphic symbol for the vehicle operator to follow and the distance to the desired destination. There is no map to read, only a simple graphic symbol and a voice prompt telling the vehicle operator where to turn and when to continue in the same direction.

U.S. Pat. No. 4,350,970, assigned to Siemens AG and issued on Sep. 21, 1982 to von Tomkewitsch and entitled "Method for Traffic Determination in a Routing and Information System for Individual Motor Vehicle Traffic" describes a method for traffic management in a routing and information system for motor vehicle traffic. The system has a network of stationary routing stations, each located in the vicinity of the roadway, which transmit route information and local information concerning its position to passing vehicles. The route information which is transmitted is the preferred routing to all beacons and zones adjacent to the beacon site. The vehicle navigation system then selects a route from all the routes transmitted by the beacon.

The trip destination address, via geodetic coordinates, is loaded by the vehicle operator into an onboard device, a navigation processor, in the vehicle and by dead reckoning techniques a distance and direction graphic is displayed. The first routing station which the vehicle passes transmits a message to the vehicle with route data to all of the adjacent beacons one of which is the next routing station. The vehicle receives the message and selects one of the recommended routes which will guide the vehicle towards its final destination. As it executes the travel to the next beacon, it accumulates time and distance traveled which it transmits to the second routing station when it is interrogated by passing the second routing station. In this manner, traffic management is updated in real time and the vehicles are always routed the "best way". Of course the best way may be the shortest way, the less traveled way, the cheapest way or any combination of these plus other criteria.

In Japanese publication JP6208698, from Sumitomo Electric Ind. LTD. dated Jul. 26, 1994, a controller in a motor vehicle operates an automotive telephone device through a modem and a line connection with an information center is performed. When the line is connected, the telephone number of the destination inputted by an operator is transmitted to the information center. The information center transmits a position coordinate corresponding to the received telephone number which is then retransmitted and stored in the controller. The controller reads a map corresponding to the position coordinate from a road map memory by a memory device. A road map is displayed on a display device in the destination facility.

SUMMARY OF THE INVENTION

In both of the aforementioned systems, the vehicle operator has had to enter into the invehicle computer, the geodetic coordinates of the destination address. These are latitude and longitude coordinates. In each case, the present systems require each coordinate to be at least a six digit number, degrees, minutes, and seconds; thus, two six digit numbers must be entered. In order to get the coordinates, the vehicle operator has to read a map or consult a look-up table and by means of a data keyboard, key in the numbers.

In the Ali-Scout system, these coordinates would be inputted into the navigation computer and until the vehicle passed the first beacon site, the vehicle display system indicates the compass heading to take. Once the vehicle passed the first beacon, the vehicle will then receive information about the best route to take to the next adjacent beacons and the computer, knowing its present geodetic location and the geodetic location of its destination address, will select the best route in the direction of the destination address.

One method of introducing the coordinates of the destination address requires the vehicle operator to study a map, a manual or some other data base means to determine the six digit word coordinates of the destination address and then enter or key in each word by means of a keyboard into the onboard memory. In the present invention, the vehicle operator enters the phone number of the destination by means of a phone-type number keyboard pad. The onboard computer transmits this number to the central processing station having a data base subsystem wherein the correlation of the phone number, physical address and the geodetic coordinates such as latitude and longitude are stored. The central processor then transmits the geodetic coordinates back to the onboard vehicle computer and the destination address is automatically and correctly loaded into the onboard memory.

In another embodiment, the onboard computer receives the present position from a GPS receiver and transmits both the present position and the desired position to the central processing station by means of a wireless communication means. The central processing station computes a series of routing vectors which are transmitted back to the onboard computer for display in a turn-by-turn manner the route for the vehicle to take to the destination position.

In addition, the invention herein provides for the entry of data input from various traffic functions to be put in the data base and such information is transmitted to the various beacon sites in the system by the central processing unit to provide better data to the vehicles concerning routing vectors.

It is therefore a principle advantage to have the operator load the destination address into the invehicle system by the simple means of dialing the telephone number of the destination and not requiring the operator to refer to various maps or other data bases for such destination coordinates.

It is another advantage to have the beacon sites be updated with traffic functional information such as travel conditions and road data, received from many sources and inputted into the central processing unit and which is transmitted to the beacon sites from the system central processing unit.

These and other advantages will become apparent from the following drawings and detailed description.

BRIEF DESCRIPTION OF THE DRAWINGS

In the drawings:

FIG. 2 is a detailed block diagram of the preferred embodiment of the invention;

FIG. 3 is a driver interface device in the vehicle for transmitting the destination phone number and accepting or rejecting a system recommended route.;

FIG. 4 is a dashboard display in the vehicle to receive one form of the information from the navigation unit including a preview of the routing and alert by the system of an in-route change of routing;

FIG. 5. is another embodiment of vehicle navigation and route guidance system;

FIG. 6. is a detail of the data base of FIG. 5; and

FIG. 7 is a schematic of route vectors which are transmitted over the wireless communication medium from a present position to a destination position.

DETAILED DESCRIPTION OF THE PREFERRED EMBODIMENT

Figure 1:
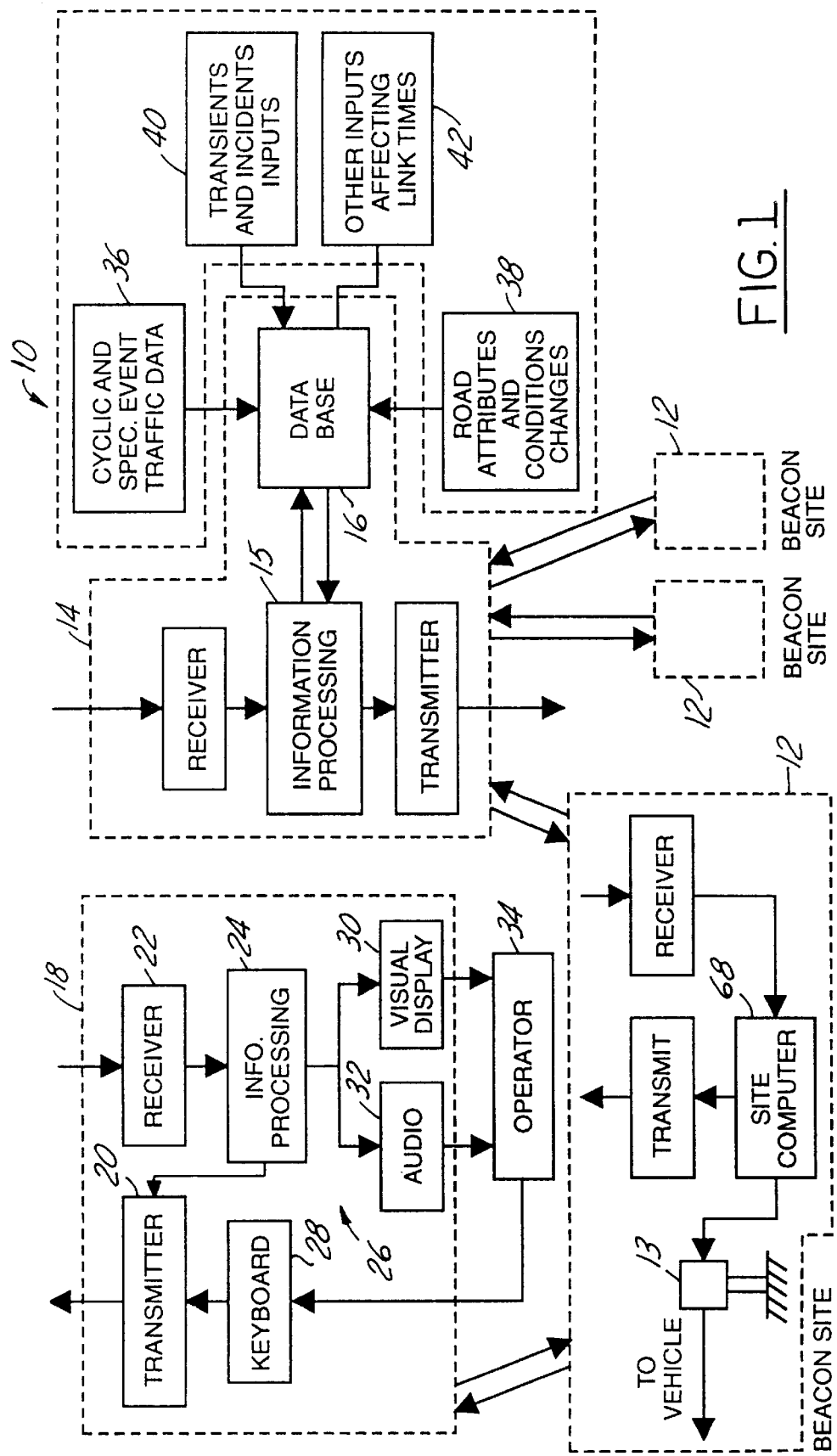
FIG. 1. is a system block diagram of the vehicle navigation and route guidance system.

Referring to FIG. 1 by the characters of reference, there is illustrated in block diagrammatic form a vehicle navigational and routing system 10.

As is known in the prior art, there are located along the sides of the roadway, several beacon sites 12, or fixed guide beacons 13, each placed strategically in the area. In an urban area, such sites are within kilometers of each other and in the rural areas, the beacon sites maybe spaced much, much farther apart.

It is the function of the beacon sites 12 to transmit information received from a central processing means 14 including an information processor 15 and a data base 16 concerning the best route to take to the adjacent beacon sites. The beacon sites 12 also receive information from a vehicle including among other information about the elapsed travel time for links vehicle activity and other information to assist in determining the "best" route from that particular beacon site 12 to each adjacent beacon site 12 and beyond.

In the prior art systems, such as the Ali-Scout™ System as developed by Siemens Aktiengesellschaft, the vehicle operator has, in his vehicle, an invehicle system 18 comprising a transmitter 20, a receiver 22, an information processing unit 24 including a position unit, a travel-time unit, a destination address processor and a memory and a display means 26 having a data entry means such as a keyboard 28, an arrow indicator guidance visual display 30 and an audio or voice messaging system 32. The Ali-Scout™ System is an infrared communication system in that the medium for transmitting and receive data from a beacon 12 to the invehicle system 18 is by means of infrared waves.

In the prior art system, the vehicle operator had to input the particular geodetic destination address coordinates found on a map or some other data look-up means. These coordinates are typically the latitude and longitude of the destination address which, of necessity, are long digital words. The operator must accurately read these numbers from his map and key them into the invehicle unit through the alpha numeric keyboard.

In the preferred embodiment, the operator 34 by knowing the phone number of his destination location does not have to read and copy unfamiliar numbers into a keyboard. The typical phone number in the United States is 7 digits long, not including the area code, and is probably a familiar number. Therefore, the error of entering such a number is much smaller. The invehicle system 18 transmits the phone number to the central processor 14 and data base 16 as a destination address request by conventional telecommunications methods such as a cellar telephone network or spread spectrum telephone network. The central processor 14 and data base 16, has the street address and the geodetic coordinates corresponding to the phone number stored in the data base 16 and coded in the proper form. This coded form is then transmitted from the central processor 14 to the invehicle unit 18 as a destination location address. Once the coordinates are located in the invehicle unit 18, the system then prepares to receive from the next beacon site 12 which it passes, the route information to the next adjacent beacon sites 12.

Another feature of the preferred embodiment is the information gathering capabilities of the central processor 14 and data base 16. The information gathered is received from other sources such as special events data 36 regarding such as sporting or cultural events, traffic events data 38 regarding such as accidents and road repairs, weather data 40, and other transient and incident data 42 which would affect the movement of vehicles along the highways and streets.

It is understood that the transmitters and receivers in the invehicle unit 18, the central processor 14 and the beacon sites 12, function to communicate and receive data between and among the several units as the IVHS system requires. As will be shown, the transmitter 20 can transmit data in the communication mode to the central process 14 and later communicate in the infrared range to the beacon sites 12.

Referring to FIG. 2, there is illustrated in block diagrammatic form, the preferred embodiment of the system of FIG. 1. FIG. 2 is a less detail block diagram which shows the invehicle system containing the dead reckoning navigational system which is a basic element of the system and the destination map 43 which is stored in the invehicle system. The dead reckoning navigational system gives the operator 34 a compass bearing on the direction to go to the destination location. In addition, the dead reckoning system maintains the proper compass headings in the vehicle in order to accurately show the direction the vehicle must travel to reach its destination location when the vehicle is in the autonomous mode of operation, that is before intercepting its first beacon site 12 or when off the course derived from the beacon. Also the invehicle system 18 has the beacon interface which was previously described incorporating an infrared communication system. The operator display means 26 was also previous described and will be described in alternate embodiments with regard to FIGS. 3 and 4.

The new feature of the preferred embodiment is the phone transmitter 44 which allows the destination location telephone number to be transmitted through the telecommunications structure or communications means 46 to the central processor 14. At the central processor 14, the destination location or address telephone number is converted to geodetic or map coordinates and transmitted by the communications means 46 to the invehicle system 18. In the alternative, the central processor 14 can also identify a specific street address corresponding to the dialed telephone number. This information can also be used for navigational purposes, or as additional information for the operator. By means of the information provided by the beacon site 12, the invehicle system 18 then operates to guide the vehicle from its present position or location to its destination address or location. In addition as previously indicated, the central processor 14 also transmits preferred routes to the beacon sites 12 based on its knowledge of area-wide traffic conditions.

Once the geodetic coordinates from the central processor 14 are inputted into the in vehicle system 18 the invehicle information processing unit 24 takes the information from its memory as to its present location, generates a direction indicator on the visual display screen 30 directing the vehicle operator 34 as to the direction to go. Once the vehicle is in position to communicate and does communicate with the first beacon site 12, the information processing unit 24 selects the "best" route using the beacon site 12 supplied information. The beacon site 12 transmits information on how to go to each adjacent beacon site 12 and it is the function of the invehicle information processing unit 24 is to select the appropriate direction information knowing its present location and the destination location. All other information received from the beacon site 12 may not utilized. The routing is either audibly 32 or visually displayed 30 or both to the vehicle operator 34 and is updated each time the vehicle is instructed to change course. The beacon site 12 receives information from the invehicle information processing unit 24 as to the amount of time and distance the car has traveled from a previous beacon so as to update the central processor 14 and data base 16 for potential new routing information. At no time does any part of the system, other than the invehicle system 18 know where the vehicle is and where it is going. This preserves the anonymity of each vehicle.

In FIG. 3, there is illustrated a keyboard 28 having a numeric keypad 48 similar to that found on a telephone. This promotes ease of data entry since most are familiar with a touch-tone phone keyboard. Since this is a telephone, there are selection buttons 50 and 52 which allow the operator 34 to indicate that the number being indexed into the keypad 48 is either for telecommunications 50 or for IVHS communications 52. As with most telephone keypads, the number entered into the keypad 48 is displayed on a display panel 54 before it transmitted. Once the correct number is displayed, the operator confirms and activates the telephone. When the destination address coordinates are returned to the invehicle system 18, the operator 34 indicates his or her acceptance by pushing the accept route button 56 and the vehicle is now able to function in the IVHS mode.

As soon as telecommunications such as a cellular phone is used, total anonymity is no longer available. Location of a vehicle can be established from the transmissions, but this is only implementable by the central processor 14 having total access to the communications network. As to the message content, the destination and routing could be overheard, but the location and identification of the receiving vehicle would not be available to a casual listener. For example, a scanner will pick-up the data transmission, but not the location of the receiving vehicle or person.

One such method of communicating the route to the vehicle operator is by a visual display device 58 as illustrated in FIG. 4. This is intended to show a different mode of visual display to the operator 34; i.e. after the invehicle information processing means 24 selects the routing from the data received from the beacon 12, it can display the routing in the following manner.

In this example, the visual display 30 shows the several street names 60 that the vehicle will take to get to its destination location or address. Next to each street name 60 is the compass direction 62 the vehicle should proceed on that particular street 60. Both the route time 64 and the route mileage 66 is or maybe shown to the vehicle operator 34.

Of key importance, is the data signal from the central processor 14 and data bank 16 to the beacon sites 12 that alerts the beacon sites to a change in the route because of information gathered by the system from the several beacons or other input means. Such information may show heavy traffic congestion or a sudden repair problem such as a water main break. This information is transmitted by the central processor 14 and data base 16 to the site computer 68 at each beacon site 12 to alter the routes from each beacon site to the adjacent beacon sites. The end result may be to redirect the vehicle when it passes the next beacon site and thereby changing the display. The visual display device 58 may have a display 70 which alters the operator 34 to a route change.

Still other embodiments of the system may provide information in a package form to commercial vehicles such as trucks. In this case, which is an example of a dedicated system, the anonymity is not an issue. The beacons are either owned or operated by the trucking company, or if there is a consortium of several companies, data from each company can be encrypted.

The dispatching department of the a freight company can access the central processor and data base with a routing for a given truck that is entering the area. This routing coincides with the delivery points where the truck is to stop and discharge its load or a partial load. As an example, ABC Cartage Company knows that its truck, having a particular identification, will be arriving in the area with a load of goods that is to be delivered to five different stops. The dispatching or similar department enters the destination address information of the different stops into the central processor. When the beacon site picks up the truck for the first time, it pulls the information of the five stops from the data bank and transmits that information to the invehicle information processing means 24 as a destination address message. The invehicle system 18 processes the best route for the driver from the normal beacon information. In the alternative, if the dispatcher deems the order of the stops is important because of the vehicle loading, the dispatcher develops the required destination address message and adds any other information so that the driver follows the best route.

There has thus been described an IVHS system wherein the geodetic coordinates of the destination location are transmitted over a communications system to the invehicle system by means of standard telephone communications. The telephone number of the destination location is transmitted from the vehicle operator 34 to a central processor 14 where it addresses a data base 16 to extract the geodetic coordinates of the location having that phone number. The central processor 14 then transmits those coordinates via the communications medium to the invehicle information processing means 24. Thus, the information processing means 24 develops the direction that the vehicle is to take from its present location to the destination with information being received from the several beacon sites 12 which the vehicle passes.

Referring to FIG. 5., there is illustrated another embodiment of the vehicle navigational and routing system 10 as illustrated in FIG. 1. In this system, the invehicle system or computer 18 is essentially a "dumb" terminal in that there is very little processing capability other than to direct the flow of information to and from system 18.

The system of FIG. 5 includes a transmitter 20, a receiver 22, an information processing unit 24, a keyboard 28, an audio 32 and visual 30 display unit, and a GPS receiver 72. The invehicle computer 18 is connected to wireless communications medium 74 to a central processing means 14 having a receiver 76, information processor 15, a transmitter 78 and a map data base 79. Coupled to the data base 79 are several inputs such as a cyclic and special event traffic data unit 36, a transients and incidents unit 40, a road attributes and conditions unit 38, and other units 42 having information about vehicle travel such as weather.

The operator 34 activates his invehicle system 18 by accessing the wireless communications medium 74 and dialing up the central processing means 14. Once the communication link is established, the operator 34 dials in the telephone number of his destination position 75 or a short character description of the destination position. The GPS receiver 72 outputs the geodetic coordinates of the present position 77 of the invehicle system 18 to the information processing means 24 creating a transmission message and if desired, a vehicle identification description can be automatically or manually entered into the message. Once the message is complete, the central processor means 14 receives the destination position telephone number or description, the geodetic coordinates of the present position and the vehicle identification if available.

In the map data base 79 is a look-up table correlating telephone numbers with geodetic coordinates, and short character descriptions of locations with geodetic coordinates. The size of the look-up table, determines the amount of information which can be addressed. The central processor means 14 uses the telephone number or short character description to determine the geodetic coordinates of the destination position 75. Both the coordinates of the destination position 75 and the present position 77 are supplied to the information processor 15 wherein a routing algorithm 80 generates routing vectors 82–87 along with distance (km) as illustrated in FIG. 7. The vectors 82–87 comprise direction and distance for the vehicle operator 34 to follow, in a turn by turn mode, from his present position 77 to the destination position. If a vehicle ID is present, the vehicle ID is appended to the particular routing vectors for updating.

The transmitter 78 in the central processor means 14 transmits, by the wireless medium 74 which has been held open by the invehicle system 18, the calculated routing vectors 82–87 back to the invehicle system. The receiver 22 in the invehicle system 18 receives the calculated routing vectors 82–87 and stores them in the information processor unit 24 in the invehicle system. Each vector 82–87 is sequentially displayed, in a turn by turn display on the visual display 30 and each turn is audibly announced to the operator 34 through the audio unit 32. As the invehicle system 18, which measures distance and direction, becomes aware of the vehicle responding to the end of the present routing vector 82–86, it causes the next sequential routing vector 83–87 to be displayed. If the operator 34 ignores a routing vector by not turning, or turns incorrectly at the proper distance, the information processing unit 24 through the audio unit 32 audibly tells the operator 34 that he/she has left the route and is capable of displaying certain prestored error messages on the visual display 30.

If the vehicle ID is stored with the route request in the central processing means 14, the operator 34 can dial-up the central processing means and with the same information such as destination position 75 and vehicle ID, but with the updated present GPS location, which is now the present location, the central processing means can interrogate the various updates to the map data base 79 and notify the operator 34 of any change in the routing vectors. Depending upon the complexity of the central processing means 14, a new set of routing vectors from this new present location to the destination position 75 can be transmitted to the invehicle system 18 which will replace the information in the information processing means 24 in the invehicle system 18.

If the beacon sites 12 are available, the present position can be determined from the beacons as described above.

There has thus been shown and described a second embodiment wherein the system uses a wireless communication medium 74 between an invehicle system 18 and a central processing means 14, for the transmission of the destination location 75 in one direction (transmitting) and for generating and the transmission of routing vectors 82 in the second direction (receiving) that are generated by the map data base and routing algorithm 80. The invehicle system 18 has no map data base or any need to reinterpret the signals received from the wireless communication medium 74. Map data is not communicated along the wireless communication medium 74.

Also if such an embodiment is used in a commercial system, the vehicle operator or truck driver can communicate via the wireless communications medium to the dispatcher for the next set of route vectors from his present position, a stop, to the next destination position, the next stop.

We claim:

1. A vehicle navigation system for directing a vehicle from its present position to a destination position, the system comprising:

an input device located in said vehicle for inputting by the vehicle operator a description of the destination position;

a GPS receiver in said vehicle for generating the geodetic coordinates of the present position of said vehicle;

invehicle information processor in said vehicle for receiving said geodetic coordinates of the present position of the vehicle and said description of the destination position and generating a transmission message therefrom including vehicle identification;

an out of vehicle central processor having a receiver, information processor, a transmitter, a map data base and a routing algorithm for generating one or more sequential routing vectors from the present position to the destination position and in response to said vehicle identification to store said routing vectors for recall in response to a subsequent transmission message having a different present position and the identical destination position and to update said routing vectors from said different present position to said destination position, each of said routing vectors and said updated vectors having a direction coordinate and a distance value;

wireless communications device operatively coupled to said invehicle information processor and operable to transmit said transmission message and said subsequent transmission message to said out of vehicle central processor and to transmit said one or more sequential routing vectors and said updated vectors to said invehicle information processor;

said invehicle information processor receives and stores said vectors; and a display in said vehicle operatively connected to said invehicle information processor for displaying said vectors in sequence, in a turn by turn format to the destination position.

2. A method of vehicle navigation for directing a vehicle from its present position to a destination position, the method comprising the steps of:

inputting to an invehicle information processor a description of the destination position;

generating a GPS geodetic coordinate value in said vehicle information processor the present position of the vehicle;

generating a vehicle identification;

transmitting a transmission message having the geodetic coordinate of the present position of the vehicle, the description of the destination position and vehicle identification from the invehicle information processor to an out of vehicle central processor;

generating in the out of vehicle central processor having a receiver, information processor, a transmitter, a map data base and a routing algorithm, in response to the transmission message one or more sequential routing vectors from the present position to the destination position, each of said routing vectors having a direction coordinate and a distance value;

storing in the out of vehicle central processor in response to the vehicle identification, said one or more sequential routing vectors to said destination position;

transmitting a second transmission message comprising the sequential routing vectors from the out of vehicle central processor;

updating in response to a subsequent present position and the vehicle identification the stored sequential routing vectors to the destination position;

transmitting in response to said subsequent present position, a subsequent transmission message from the out of vehicle central processor comprising the updated stored sequential routing vectors;

storing said routing vectors in said invehicle information processor; and sequentially displaying in the vehicle said routing vectors in a turn by turn mode a route from the present position to the destination position.

3. A vehicle navigation system for directing a vehicle from its present position to a destination position, the system comprising:

an invehicle processing information unit having a means for generating a vehicle identification;

a GPS for generating a present position of the vehicle;

means for generating a destination position;

an off site central processor having a map data base and a routing algorithm operatively connected to the map data base and capable of generating sequential routing vectors from the present position to the destination position forming a route, and in response to the vehicle identification storing said sequential routing vectors, each of said vectors having a direction coordinate and a distance value from the end of the previous vector;

means in said central processor responding to a succeeding transmission of the same vehicle identification and a different present position to update said stored routing vectors from said different present position to destination position;

wireless communications medium for transmitting the present, said different present and destination positions to said central processor, and said stored routing vectors and said updated vectors between the central processor and the invehicle processing information unit;

said invehicle processing information unit receives said vectors, measures the distance traveled along a vector by the vehicle and connects each sequential vector to the next succeeding vector at the end of the measured travel distance;

means for sequentially displaying in the vehicle said vectors in a turn by turn manner forming said route from the present or the different present position to the destination position.

* * * * *